(12) United States Patent
Gu et al.

(10) Patent No.: US 10,906,130 B2
(45) Date of Patent: Feb. 2, 2021

(54) METHOD AND APPARATUS FOR LASER ASSISTED POWER WASHING

(71) Applicant: Magna International Inc., Aurora (CA)

(72) Inventors: Hongping Gu, Newmarket (CA); Boris Shulkin, West Bloomfield, MI (US)

(73) Assignee: Magna International Inc., Aurora (CA)

( * ) Notice: Subject to any disclaimer, the term of this patent is extended or adjusted under 35 U.S.C. 154(b) by 525 days.

(21) Appl. No.: 15/311,827

(22) PCT Filed: Jun. 18, 2015

(86) PCT No.: PCT/CA2015/000404
§ 371 (c)(1),
(2) Date: Nov. 16, 2016

(87) PCT Pub. No.: WO2015/192220
PCT Pub. Date: Dec. 23, 2015

(65) Prior Publication Data
US 2017/0361403 A1 Dec. 21, 2017

Related U.S. Application Data

(60) Provisional application No. 62/014,297, filed on Jun. 19, 2014.

(51) Int. Cl.
*B08B 5/02* (2006.01)
*B08B 7/00* (2006.01)
(Continued)

(52) U.S. Cl.
CPC .............. *B23K 26/142* (2015.10); *B08B 5/02* (2013.01); *B08B 7/0042* (2013.01);
(Continued)

(58) Field of Classification Search
CPC ....... B08B 7/0042; B08B 7/0057; B08B 5/02; B08B 7/0071; B08B 7/04; B23K 26/142;
(Continued)

(56) References Cited

U.S. PATENT DOCUMENTS 4,000,392 A * 12/1976 Banas ................ B23K 26/0643
219/121.63
4,424,435 A * 1/1984 Barnes, Jr. ........... B23K 26/244
219/121.64

(Continued)

FOREIGN PATENT DOCUMENTS

CN 103817113 A * 5/2014
CN 103817113 A 5/2014
(Continued)

*Primary Examiner* — Nadine G Norton
*Assistant Examiner* — Christopher Remavege
(74) *Attorney, Agent, or Firm* — Adam R. Stephenson, LTD.

(57) ABSTRACT

A process for removing a material that is adhered to an underlying surface includes using a laser beam to heat the material to reduce the strength of adhesion between the material and the underlying surface. A stream of gas is directed at the heated material to displace the heated material from the underlying surface.

15 Claims, 6 Drawing Sheets

(51) Int. Cl.
*B08B 7/04* (2006.01)
*B23K 26/142* (2014.01)
*B23K 26/36* (2014.01)
*C23G 5/00* (2006.01)

(52) U.S. Cl.
CPC .............. *B08B 7/0071* (2013.01); *B08B 7/04* (2013.01); *B23K 26/36* (2013.01); *C23G 5/00* (2013.01)

(58) Field of Classification Search
CPC ............ B23K 26/0624; B23K 26/1436; B23K 26/1437; B23K 26/361; B23K 26/36; C23G 5/00
USPC ....... 134/1; 216/65, 66; 219/121.64, 121.63, 219/121.84, 121.82
See application file for complete search history.

(56) References Cited

U.S. PATENT DOCUMENTS

| | | | | |
|---|---|---|---|---|
| 4,684,779 | A * | 8/1987 | Berlinger | B23K 26/123 219/121.64 |
| 5,045,668 | A * | 9/1991 | Neiheisel | B23K 26/032 219/121.63 |
| 5,229,571 | A * | 7/1993 | Neiheisel | B23K 26/10 219/121.63 |
| 5,643,472 | A * | 7/1997 | Engelsberg | B08B 7/0042 134/1 |
| 5,736,709 | A * | 4/1998 | Neiheisel | B08B 7/0042 219/121.61 |
| 6,191,379 | B1 * | 2/2001 | Offer | B23K 9/0213 219/121.63 |
| 6,874,510 | B2 * | 4/2005 | Reder | B08B 7/0042 134/1 |
| 8,628,624 | B2 * | 1/2014 | Turner | B08B 7/0042 134/1 |
| 2004/0188394 | A1 * | 9/2004 | Becker | B23K 26/60 219/121.64 |
| 2004/0200813 | A1 * | 10/2004 | Alips | B23K 15/0046 219/121.63 |
| 2005/0092725 | A1 * | 5/2005 | Byrd | B23K 26/147 219/121.85 |
| 2005/0150522 | A1 * | 7/2005 | Okada | B08B 7/0042 134/22.11 |
| 2007/0170158 | A1 * | 7/2007 | Greig | B23K 26/034 219/121.64 |
| 2009/0134132 | A1 * | 5/2009 | Verna | B23K 26/1476 219/121.64 |
| 2010/0102194 | A1 | 4/2010 | Haynes et al. | |
| 2012/0211474 | A1 * | 8/2012 | Hayashimoto | B23K 26/28 219/121.64 |
| 2013/0092666 | A1 * | 4/2013 | Oh | B23K 1/0056 219/121.64 |
| 2014/0144893 | A1 * | 5/2014 | Yang | B23K 9/0026 219/121.64 |
| 2015/0196974 | A1 * | 7/2015 | Rominger | B23K 26/147 219/121.84 |
| 2015/0251274 | A1 * | 9/2015 | Hanschmann | B23K 35/3033 403/272 |
| 2015/0266130 | A1 * | 9/2015 | Fomin | B23K 26/0096 219/121.62 |
| 2016/0114428 | A1 * | 4/2016 | Wang | B23K 26/211 427/554 |
| 2016/0303688 | A1 * | 10/2016 | De Souza | B23K 26/21 |

FOREIGN PATENT DOCUMENTS

| | | | |
|---|---|---|---|
| EP | 1992424 A1 * | 11/2008 | .......... B08B 7/0042 |
| EP | 1992424 A1 | 11/2008 | |
| WO | 0166365 A2 | 9/2001 | |

* cited by examiner

METHOD AND APPARATUS FOR LASER ASSISTED POWER WASHING

CROSS REFERENCE TO RELATED APPLICATIONS

This document is a National Stage application submitted under 35 U.S.C. 371 of PCT application PCT/CA2015/000404, having an international filing date of Jun. 18, 2015, listing as first inventor Hongping Gu, titled "Method and Apparatus for Laser Assisted Power Washing," which in turn claims the benefit of the filing date of U.S. Provisional Pat. App. No. 62/014,297, filed Jun. 19, 2014, listing as first inventor Hongping Gu, titled "Method and Applications of Laser Assisted Power Washing," the disclosures of each of which are hereby incorporated entirely herein by reference.

FIELD OF THE INVENTION

The instant invention relates generally to a method and apparatus for cleaning metallic surfaces. More particularly, the instant invention relates to a laser assisted power washing method and apparatus, in which material that is heated by the laser is subsequently removed from a surface using a stream of gas.

BACKGROUND OF THE INVENTION

In a process for manufacturing a metallic product, it is sometimes necessary to clean a specific surface before subsequent steps can be performed. For instance, the cleaning is necessary in order to remove or eliminate undesirable material that is present on the surface. Known approaches include washing the surface using a media to flush off the material, grinding the surface using a mechanical tool to remove the material, and dissolving the material using a chemical solvent. Each approach suffers from some form of disadvantage and/or limitation. Washing using a media is not effective when the material is strongly adhered to a surface but may be suitable for removing loose material. Grinding is labor intensive, causes tool wear and is not easily automated or is limited by accessibility. Dissolving requires the use of chemicals that may not be environmentally friendly, and require additional health and safety precautions.

Based on the discussion that is presented above, a cleaning method should be simple and easily automated, low cost with high throughput, flexible, avoid unnecessary tool wear and maintenance, and be environmentally friendly. Further, a cleaning method should be suitable for use in different applications, which may present unique challenges.

Gas metal arc welding (GMAW) is a process that is used in the manufacture of metallic products, such as for instance for joining sheet metal parts in the manufacturing of automobiles. During the GMAW process silicon, which is commonly present in the base steel metal, electrode welding wire and welding flux, combines with the oxygen in the weld pool and forms a silicate during the solidification process. The silicate appears on top of the weld bead in the form of so-called "silicate islands." Unfortunately, the silicate islands are not paint friendly. As such, when the finished product including the weld area is painted, the paint that is applied over the silicate islands will tend to peal off. The exposed silicate islands initiate corrosion under normal use conditions.

It is desirable to avoid paint peel off in order to improve corrosion resistance of manufactured metallic products. Although it is possible to cover the silicate islands with a coating or layer that is paint friendly, this tends to be costly and is therefor not an ideal solution. Preferably, the silicate islands are removed from the surface of the weld bead such that paint peel off is no longer a concern. Unfortunately, current techniques for removing the silicate islands involve mechanical grinding, which is labor intensive and not easily automated, results in tool wear, and is limited by accessibility issues, etc.

Even before metallic components can be welded together, it may be necessary to perform some cleaning of the surfaces that are to be joined. By way of a specific and non-limiting example, many powertrain components are produced by joining several machined parts together to form a functional product. Oil residues are always present on the machined surfaces due to the machining process, transportation, storage, etc. These oil residues cause weld defects, such as weld metal blow out, and need to be cleaned before the parts are assembled together for welding.

It is desirable to avoid weld defects in manufactured metallic products. Although oil residues may be removed by washing with a washing fluid followed by drying, such an approach is not environmentally friendly due to the use of chemical solvents, requires additional equipment and consumes production floor space, and tends to be messy.

It would be beneficial to overcome at least some of the above-mentioned limitations and disadvantages of the prior art.

SUMMARY OF THE INVENTION

According to an aspect of at least one embodiment of the instant invention, a process is disclosed for removing a material that is adhered to an underlying surface, the process comprising: using a laser beam, heating the material to reduce a strength of adhesion between the material and the underlying surface; directing a stream of gas at the heated material; and using the stream of gas, displacing the heated material from the underlying surface.

According to an aspect of at least one embodiment of the instant invention, a process is disclosed for removing a material that is adhered to an underlying surface, the process comprising: using a laser beam, heating the material until one of the following occurs: i) the material changes from its solid state to its molten state; and ii) the material pyrolizes to form a residue of the material; and using a stream of gas, displacing from the underlying surface the material in its molten state or the residue of the material.

According to an aspect of at least one embodiment of the instant invention, a system is disclosed for removing a material that is adhered to an underlying surface, the system comprising: a laser beam source for providing a laser beam to heat the material; a nozzle in communication with a source of a compressed gas; and a controller for controlling the laser beam source to scan a beam spot across the material that is adhered to the underlying surface, and for advancing the nozzle behind the beam spot such that a stream of gas exits from the nozzle and impinges upon the heated material or a residue thereof, the nozzle producing a stream of gas that has sufficient force to remove the heated material or the residue thereof from the underlying surface.

BRIEF DESCRIPTION OF THE DRAWINGS

The instant invention will now be described by way of example only, and with reference to the attached drawings, wherein similar reference numerals denote similar elements throughout the several views, and in which.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
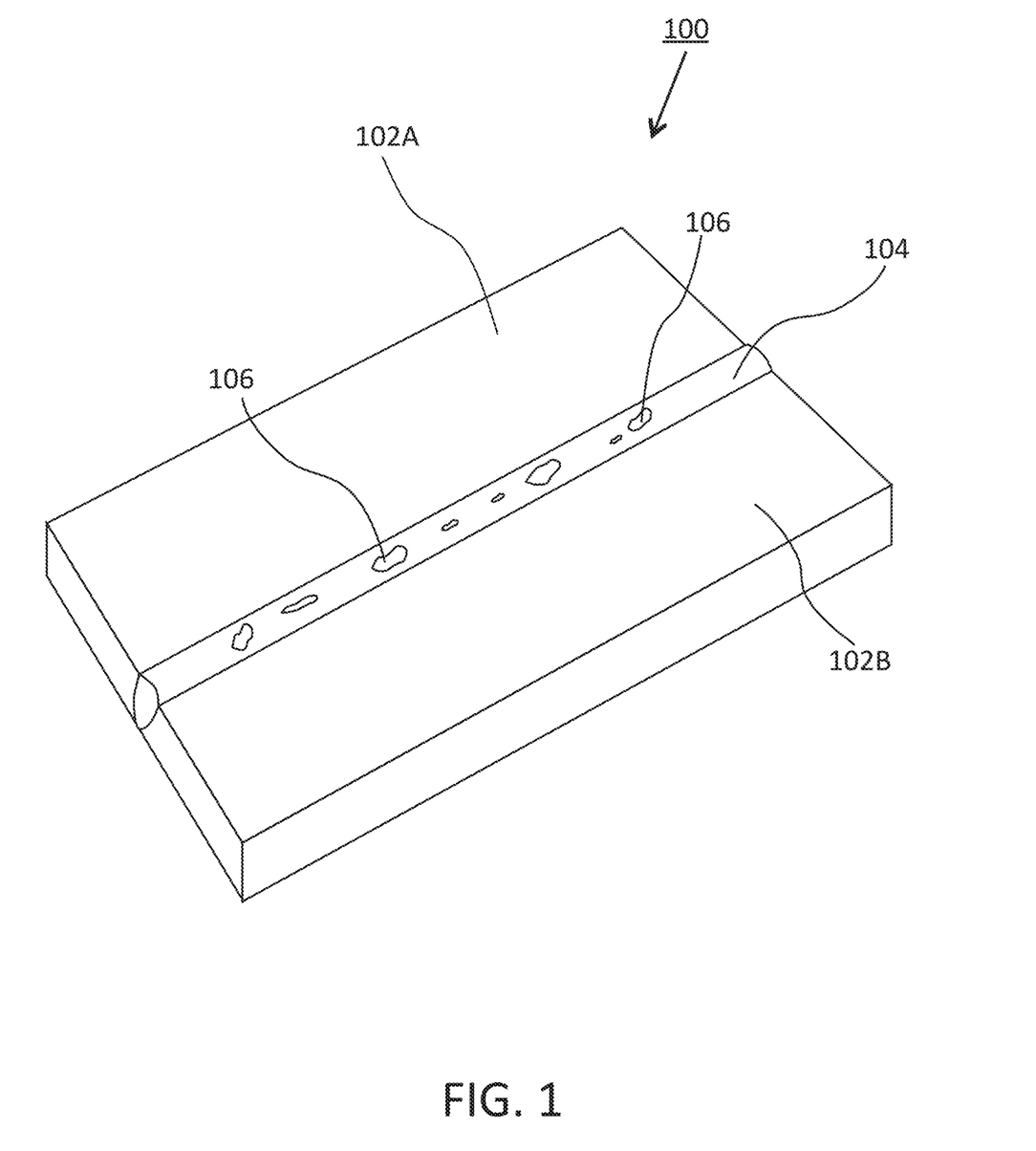
FIG. 1 is a simplified perspective diagram showing a metallic product that is made by welding together two sheet-metal components, and including silicate islands that have been formed on an underlying weld beam.

FIG. 1 is a simplified perspective diagram showing a metallic product 100 comprising two welded together sheet-metal components 102A and 102B. By way of a specific and non-limiting example, the components 102A and 102B are joined together by gas metal arc welding (GMAW), resulting in weld bead 104 between the components 102A and 102B. As shown in FIG. 1, silicate islands 106 have been formed on the underlying weld bead 104 during the welding step.

Figure 2:
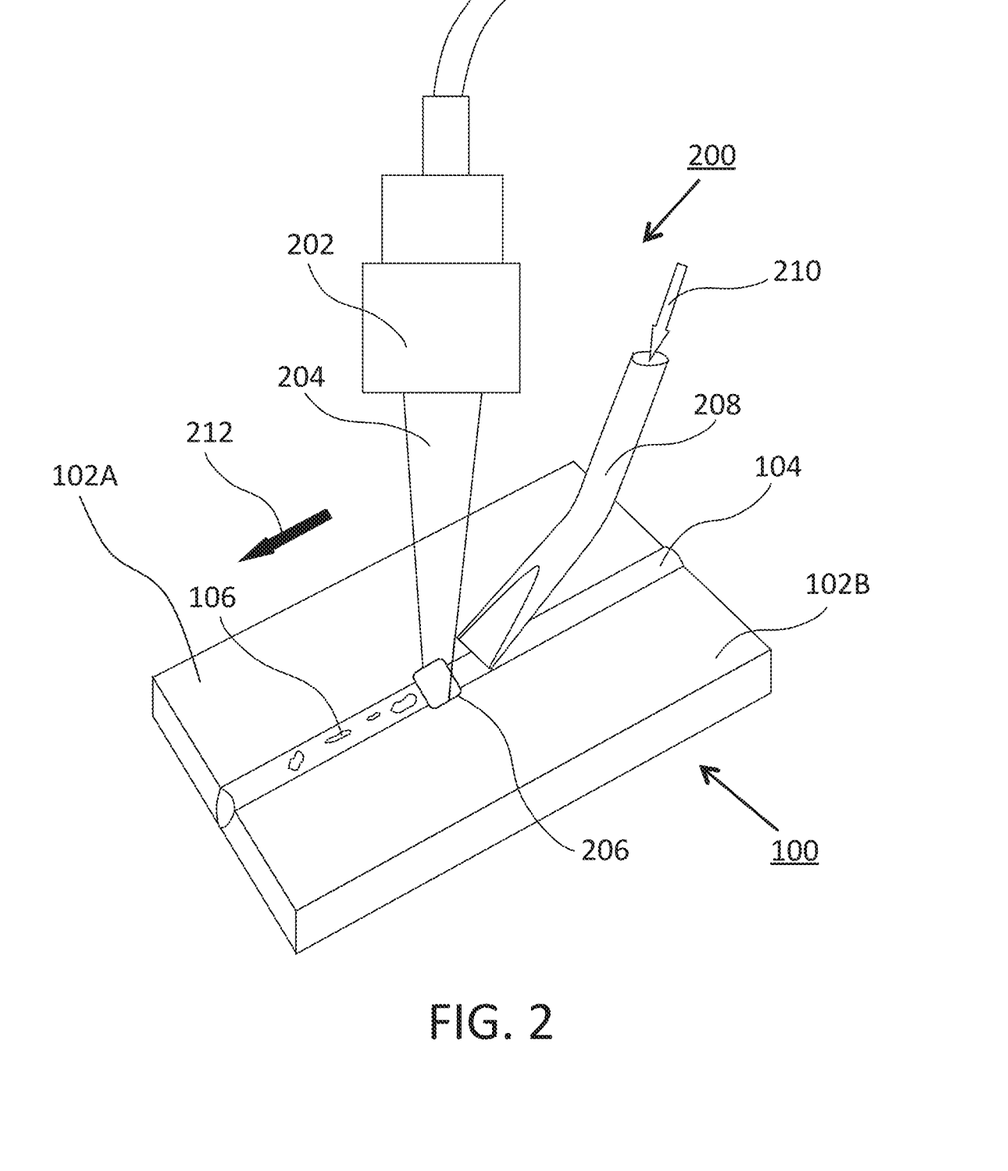
FIG. 2 is a simplified perspective diagram showing laser assisted power washing of the metallic product of FIG. 1.

FIG. 2 is a simplified perspective diagram showing laser-assisted power washing of the metallic product 100 of FIG. 1 using a system 200 in accordance with an embodiment of the invention. A beam shaping optic 202 directs a laser beam 204 toward the metallic product 100, forming a beam spot 206 that is advanced along a path as indicated by arrow 212. More particularly, the beam spot 206 irradiates and heats material 106 that is adhered to the underlying surface of the weld bead 104, e.g., the silicate islands 106. Due to the size and shape of the beam spot 206, the underlying weld bead 104 is also heated. Heating to a sufficiently high temperature, such as for instance between about 1100° C. and about 1200° C., reduces the strength of adhesion between the material 106 and the underlying weld bead 104. A nozzle 208, which is in communication with a source of compressed gas 210, is used to direct a stream of the gas to impinge upon and remove the heated material 106 from the underlying weld bead 104. By way of a specific and non-limiting example, the compressed gas is at least one of compressed air, compressed nitrogen, compressed argon, compressed carbon dioxide, etc., or another suitable gas, and includes a combination thereof. Other suitable gases are those gases that are not reactive with the weld bead or with the metallic product under the conditions of laser-assisted power washing, and that do not pose unacceptable health, safety or other concerns, such as for instance a risk of explosion or fire.

Referring still to FIG. 2, the beam spot 206 is advanced along the weld bead 104 in the direction that is indicated by arrow 212. Similarly, the nozzle 208 is advanced along the same direction and preferably the spacing between the beam spot 206 and the nozzle 208 is maintained constant. For instance, the beam shaping optic 202 and the nozzle 208 are both mounted, at a fixed separation distance, to a computer numerical controlled (CNC) machine that is controlled by a not illustrated controller. In an embodiment, the CNC machine is a gantry robot. By way of a specific and non-limiting example, for removing silicate islands 106 from an underlying weld bead 104, the laser beam power is about 3 kW and the produced beam spot 206 is about 5.5 mm×5.5 mm. The beam spot 206 and nozzle 208 are scanned at a speed of about 60 mm/s, and the nozzle 208 has a generally slot-shaped orifice of about 10 mm width, which supplies the stream of the compressed gas at a pressure of about 150 psi. In order to avoid causing disturbances to the underlying weld bead 104, the surface of which may be heated to a temperature that is sufficient to cause the weld material to liquefy, it is desirable to use a stream of gas that provides just barely enough force to remove the silicate islands 106.

Figure 3A:
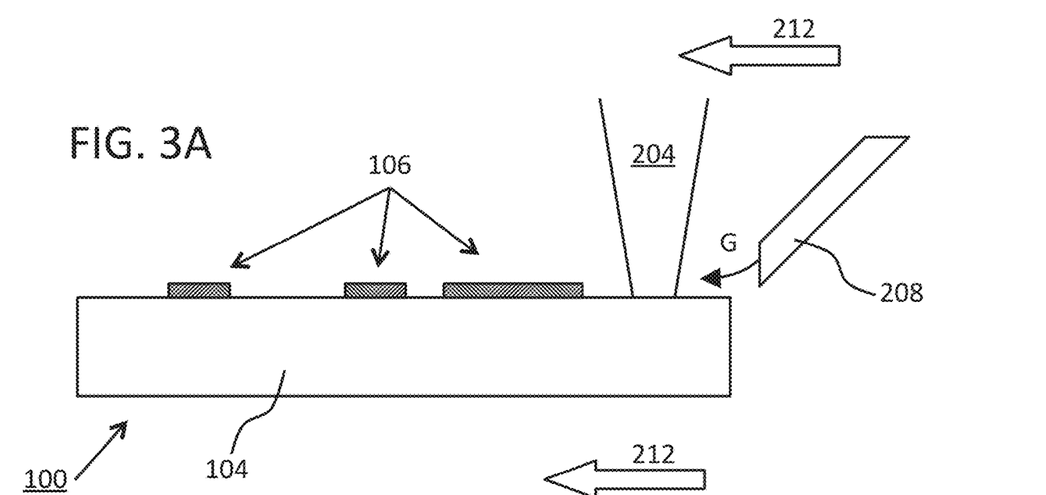
FIG. 3A shows a surface being subjected to laser-assisted power washing, prior to irradiating a silicate island with the laser.
Figure 3B:
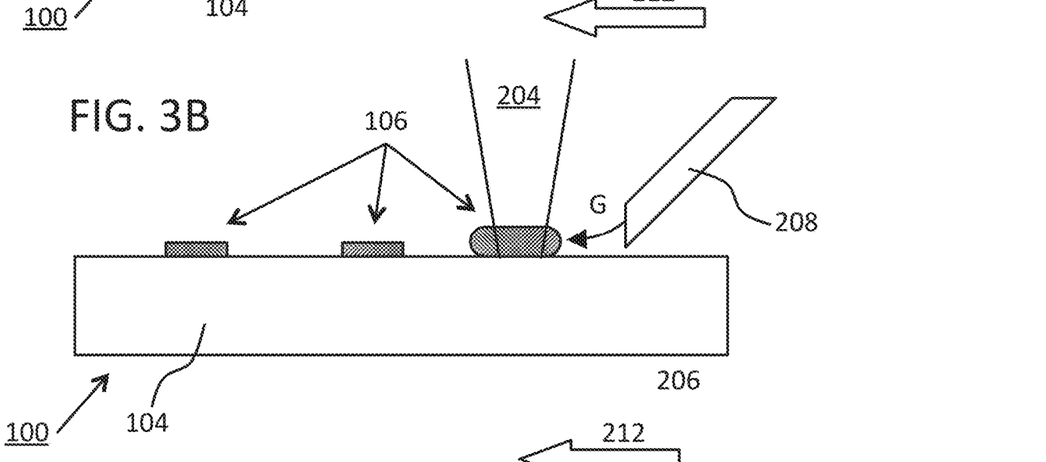
FIG. 3B shows the surface of FIG. 3A at a time the silicate island is being irradiated with the laser.
Figure 3C:
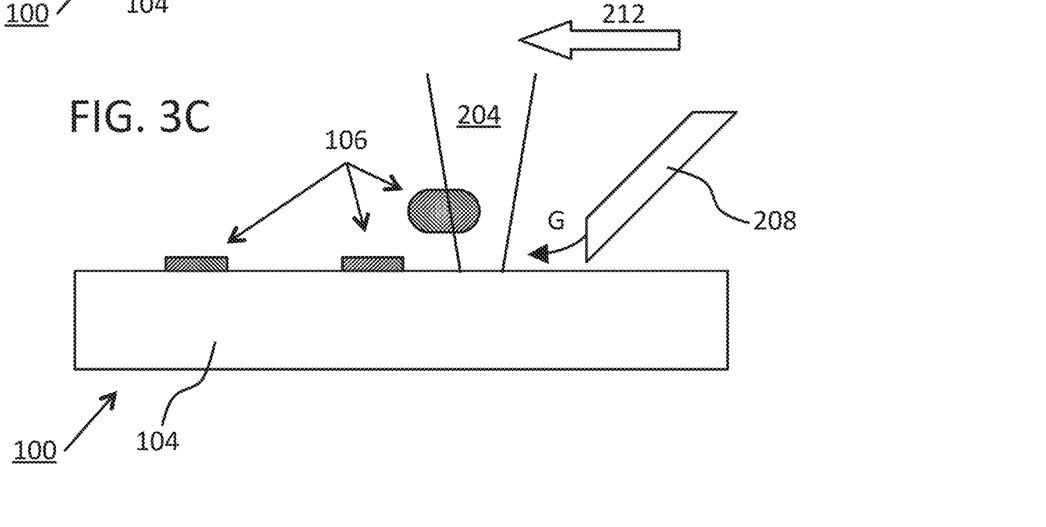
FIG. 3C shows the surface of FIG. 3A at a time the silicate island is being displaced from the surface using a stream of gas.

FIGS. 3A-C are simplified side views showing different stages of the laser-assisted power washing of the metallic product 100 of FIG. 1. In FIG. 3A the laser beam 204 and nozzle 208 are being scanned across the weld bead 104 in the direction of the block arrow 212. The laser beam 204 is not irradiating any of the silicate islands 106 that are adhered to the weld bead 104. In FIG. 3B the laser beam 204 and nozzle have advanced along a path and encountered the first of a plurality of silicate islands 106 adhered to the weld bead 104. The laser beam 204 irradiates and heats the first silicate island 106, liquefying it and thereby reducing the strength of adhesion between the first silicate island 106 and the weld bead 104. In FIG. 3C the laser beam 204 and the nozzle 208 have continued to advance in the direction of the block arrow 212, such that the stream of gas illustrated by the arrow G emerging from the nozzle 208, impinges upon and dislodges the liquefied first silicate island 106. The process is repeated with the second and third silicate islands etc., as the laser beam 204 and the nozzle continue to advance in the direction of the block arrow 212.

Figure 4A:
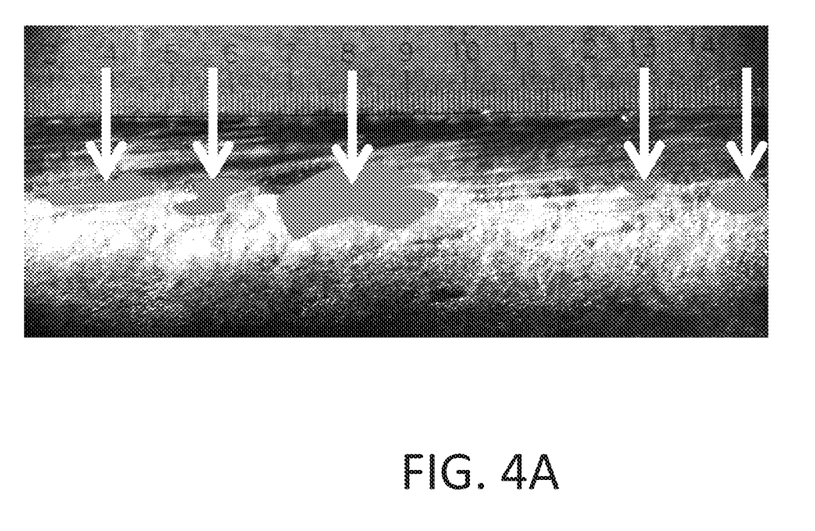
FIG. 4A is an image showing a weld beam prior to laser assisted power washing.
Figure 4B:
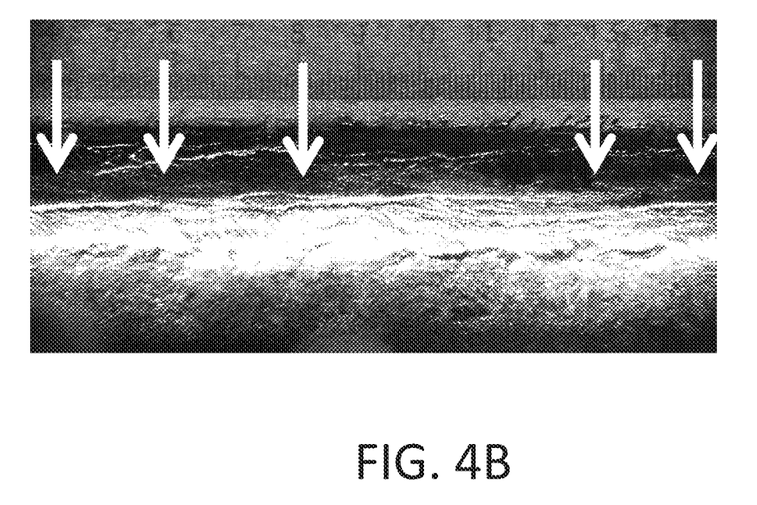
FIG. 4B is an image showing a weld beam subsequent to laser assisted power washing.

FIGS. 4A and 4B are images of a weld bead that were taken prior to undergoing laser-assisted power washing and subsequent to undergoing laser-assisted power washing, respectively. The series of arrows in FIG. 4A indicate the locations of silicate islands along the weld bead. As is shown in FIG. 4B, the laser-assisted power washing resulted in the removal of all visible silicate islands.

In addition to removing silicate islands from weld beads, as discussed with reference to FIGS. 1 through 4B, the laser-assisted power washing process and system may also be used to remove other undesired materials from surfaces.

Figure 5A:
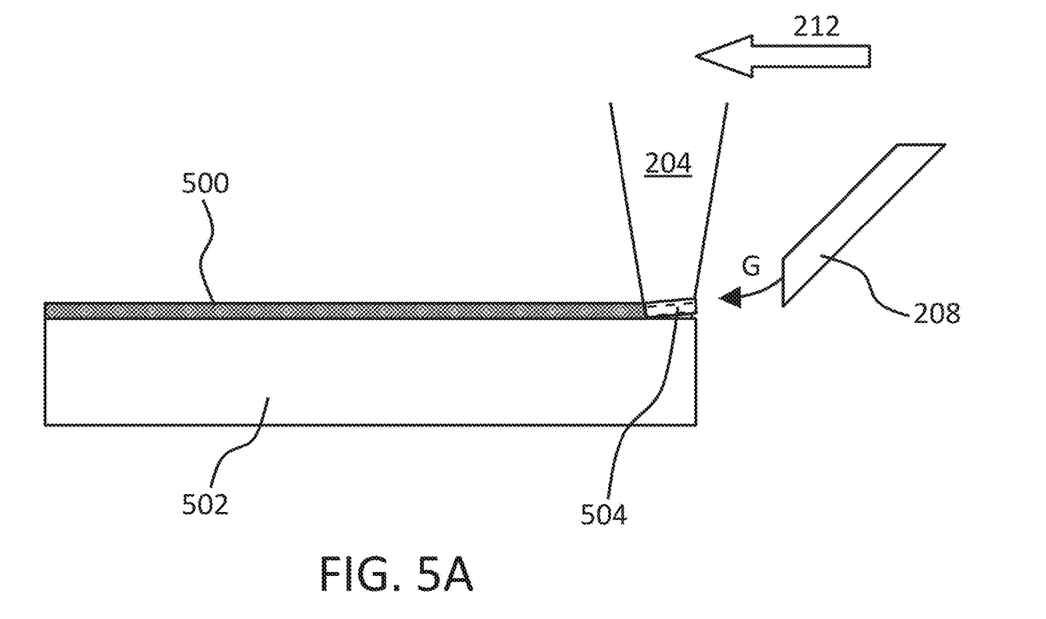
FIGS. 5A-5B depict a process for the removal of an oily residue by laser-assisted power washing.
Figure 5B:
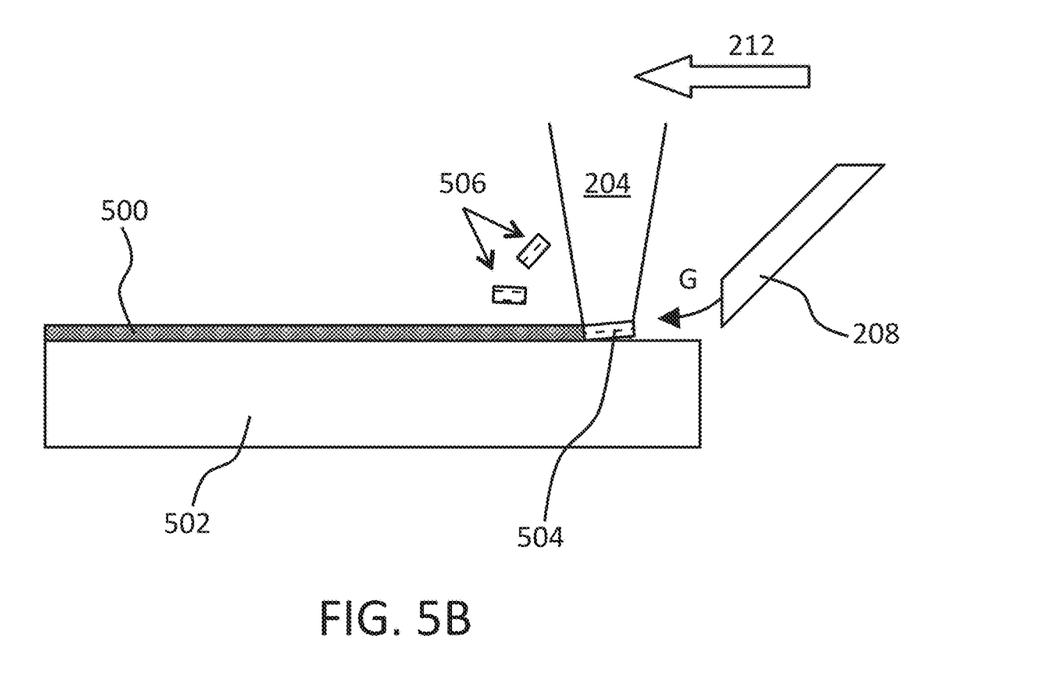

For instance, undesired materials may be removed from machined surfaces prior to welding together metallic parts, as will be discussed with reference to FIGS. 5A-B. In particular, FIG. 5A is a side view showing a material 500, such as an oily material on a machined interface due to machining processes, transportation and/or storage, adhered to a machined metallic surface 502, at an early time during the laser-assisted power washing process. Laser beam 204 is directed toward the material 500 on the surface 502, which causes the material 500 to be heated to a temperature at which it softens and/or pyrolizes. Within this context, the term "pyrolize" is used to denote a heat-induced chemical change that results in the original material 500 being converted into a residue material 504 that is adhered to the surface less strongly than the original material 500. The exact nature of the residue material is not critical nor is it even necessarily reproducible. All that is required, for the purposes that are discussed herein, is that the material 500 is converted into a form (softened or a residue) that can be dislodged from the surface by the action of a stream of gas illustrated by the arrow G emerging from the nozzle 208.

Referring still to FIG. 5A, the laser beam has heated a first portion of the material 500 sufficiently to form residue material 504, which begins to dislodge due to the force that is exerted by the stream of gas G exiting the nozzle 208. As shown in FIG. 5B, the laser beam 204 and the nozzle 208 advance in the direction of the block arrow 212 such that a second portion of the material 500 is heated to form the residue material 504 and such that removal of the previously formed residue material is completed.

Figure 6:
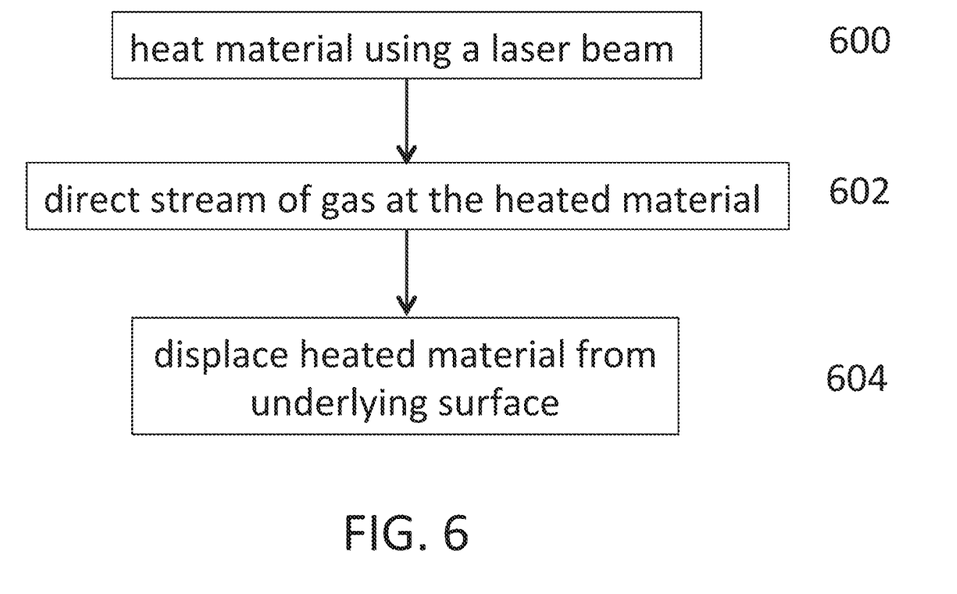
FIG. 6 is a simplified flow diagram for a process according to an embodiment of the invention.

Referring now to FIG. 6, shown is a simplified flow diagram for a process according to an embodiment of the invention. In particular, the process that is described with reference to FIG. 6 is for removing a material that is adhered to an underlying surface. For instance, the material that is to be removed comprises silicate islands and the underlying surface is a weld bead, or the material that is to be removed comprises an oily film and the underlying surface is a metallic surface. At 600, using a laser beam, material that is to be removed from an underlying surface is heated so as to reduce the strength of adhesion between the material and the underlying surface. At 602 a stream of gas is directed at the heated material. For instance, a nozzle that is in communication with a source of compressed gas, e.g., compressed air or nitrogen or another suitable gas, is used to direct the stream of gas at the heated material. At 604, the heated material is displaced from the underlying surface, under the influence of the force of the stream of gas. Displacing the material involves advancing the nozzle along the path of the laser beam across the underlying surface. In the process that is described with reference to FIG. 6, the stream of gas is selected to impinge upon the heated material with a force that is just barely sufficient to dislodge the heated material from the underlying surface.

Figure 7:
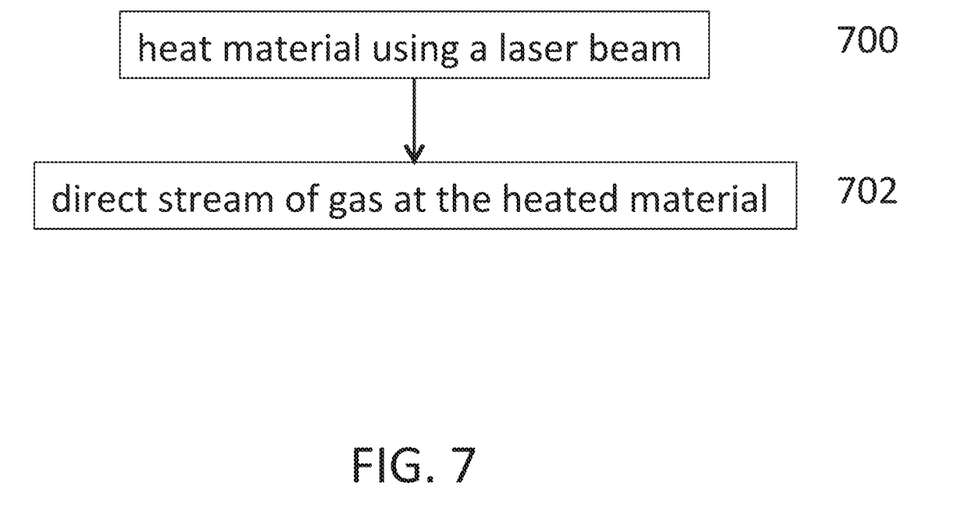
FIG. 7 is a simplified flow diagram for another process according to an embodiment of the invention.

Referring now to FIG. 7, shown is a simplified flow diagram for another process according to an embodiment of the invention. In particular, the process that is described with reference to FIG. 7 is for removing a material that is adhered to an underlying surface. For instance, the material that is to be removed comprises silicate islands and the underlying surface is a weld bead, or the material that is to be removed comprises a film of oil and the underlying surface is a metallic surface. At 700, using a laser beam, the material is heated until one of the following occurs: (i) the material changes from its solid state to its molten state; and (ii) the material pyrolizes to form a residue of the material. In either case, the strength of adhesion between the heated material, or the residue that is formed during heating the material, and the underlying surface is less than the strength of adhesion between the unheated material and the underlying surface. At 702, subsequent to heating the material, a stream of gas is used to displace the material in its molten state or the residue of the material from the underlying surface. For instance, a nozzle that is in communication with a source of compressed gas, e.g., compressed air or nitrogen or another suitable gas, is used to direct the stream of gas at the heated material. Displacing the material or the residue involves advancing the nozzle along the path of the laser beam across the underlying surface. In the process that is described with reference to FIG. 7, the stream of gas is selected to impinge upon the heated material with a force that is just barely sufficient to dislodge the heated material from the underlying surface.

One of skill in the art will appreciate that any numerical values or ranges are discussed in the context of specific and non-limiting examples, and that different numerical values or ranges may be suitable for different applications. It is to be appreciated that the laser beam supplies energy to cause reduced adhesion strength between a material that is to be removed and the surface that underlies the material. Depending on the nature of the material and the underlying surface, the laser beam may be relatively high intensity or relatively low intensity. Normally, a relatively large beam spot is suitable and therefore a low brightness laser beam may be employed. Referring to the specific example of removing silicate islands, normally a high power laser beam is required. Referring to the specific example of removing undesired material, such oily films, normally a low power laser beam is sufficient.

It is to be noted that silicate islands have been presented as one specific and non-limiting example of the types of materials that may be removed using the process and system for laser-assisted power washing. Silicate has low solubility to weld metal, and silicate and steel alloy have distinctive different crystal structures such that the bonding between the silicate and the metal alloy is not metallurgical.

Further, the provided specific examples of beam spot shape and size, nozzle geometry, etc. are not intended to be limiting. Beam spots optionally are circular, square, rectangular etc. and sufficiently wide to cover the width of a weld bead that is being cleaned. It is preferred that the beam energy distribution is uniform. In addition, the required laser beam intensity depends on scan speed, beam shape, etc., as well as the nature of the material that is to be removed. The laser beam can be continuous wave or pulsed, depending on the material to be removed and the substrate. Nozzle geometry preferably includes a narrow but wide slot opening for providing a high flow rate covering a large width.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Numerical ranges include the end-point values that define the ranges. For instance, "between 1100° C. and 1200° C." includes both 1100° C. and 1200° C., as well as all temperature values between 1100° C. and 1200° C.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A process for removing a material that is adhered to an underlying surface, the process comprising:
    using a laser beam, heating the material and the underlying surface to substantially an equivalent temperature to reduce a strength of adhesion between the material and the underlying surface;
    directing a stream of gas at the material; and
    using the stream of gas, displacing the material from the underlying surface,
    wherein the material is at least partially in a liquid state or at least partially in a solid state when it is displaced from the underlying surface by the stream of gas;
    wherein the underlying surface is a weld bead having a length and the material is a silicate island, and
    wherein using the laser beam comprises forming a beam spot and scanning the beam spot in a direction along the length of the weld bead to heat the material and a localized portion of the underlying surface around the material, to a temperature that is sufficient to liquefy at least one of the material or the localized portion of the underlying surface.

2. The process of claim 1, wherein the stream of gas provides a force that is sufficient to remove the material from the underlying surface but that is not sufficient to remove the material from the underlying surface prior to the material being heated.

3. The process of claim 1, wherein the stream of gas is a stream of at least one of air, nitrogen, argon, and carbon dioxide.

4. The process of claim 1, wherein the temperature is between 1100° C. and 1200° C.

5. The process of claim 1, wherein using the laser beam comprises forming the beam spot to heat the material to a temperature that is sufficient to pyrolize the material.

6. The process of claim 1, wherein directing the stream of gas comprises moving a nozzle assembly along a path that follows the beam spot along the length of the weld bead.

7. The process of claim 6, wherein the beam spot is a square beam spot measuring about 5.5 mm by about 5.5. mm and the beam spot is scanned at a speed of about 60 mm/s.

8. A process for removing a material that is adhered to an underlying surface, the process comprising:
   using a laser beam, heating the material and the underlying surface to substantially an equivalent temperature until at least one of the following occurs:
   i) the material changes from its solid state to its molten state; and
   ii) the material pyrolizes to form a residue of the material; and
   using a stream of gas, displacing from the underlying surface the material in its molten state or the residue of the material, and
   wherein the underlying surface is a weld bead having a length and the material is a silicate island,
   wherein using the laser beam comprises forming a beam spot and scanning the beam spot in a direction along the length of the weld bead to heat the material and a localized portion of the underlying surface around the material, and
   wherein the heating liquefies the localized portion of the underlying surface.

9. The process of claim 8, wherein the stream of gas provides a force that is sufficient to remove the material in its molten state or the residue of the material from the underlying surface but that is not sufficient to remove the material from the underlying surface prior to the material being heated.

10. The process of claim 8, wherein the stream of gas is a stream of at least one of air, nitrogen, argon, and carbon dioxide.

11. The process of claim 8, wherein the temperature is between 1100° C. and 1200° C.

12. A system for removing a material that is adhered to an underlying surface, the system comprising:
   a continuous laser beam source for providing a laser beam to heat the material, wherein the material is a silicate island and the underlying surface is a weld bead having a length;
   a nozzle in communication with a source of a compressed gas; and
   a controller for controlling the laser beam source to scan a beam spot in a direction along the length of the weld bead and across the material that is adhered to the underlying surface, and for advancing the nozzle behind the beam spot such that a stream of gas exits from the nozzle and impinges upon the heated material or a residue thereof, the nozzle producing a stream of gas that has sufficient force to remove the heated material or the residue thereof from the underlying surface, wherein during use the heated material or the residue thereof is at least partially in a liquid state or at least partially in a solid state when it is displaced from the underlying surface by the stream of gas.

13. The system of claim 12, wherein the nozzle has a slot-shaped orifice that is approximately 10 mm wide.

14. The system of claim 12, wherein the laser beam source comprises a beam shaping optic that is coupled to a beam generator via an optical fiber.

15. The system of claim 12, wherein the laser beam source and the nozzle are supported, at a fixed separation distance, by a computer numerical controlled (CNC) machine controlled by the controller.

* * * * *